Patented Nov. 15, 1927.

1,649,326

UNITED STATES PATENT OFFICE.

NEWTON H. SCHNEIDER, OF SALINAS, CALIFORNIA.

ACID-RESISTING COMPOUND FOR TREATMENT OF HANDS.

No Drawing.    Application filed February 10, 1925.    Serial No. 8,293.

My invention is a composition of matter to be rubbed and spread on the hands to protect them from burns or scalds due to acids of various kinds. An object of my invention is to provide a mixture of ingredients which will counteract the action of acids on the skin, stay on the hands, without being inconvenient, and be healing in its function should the hands become somewhat burned. To do this I provide as one or more of ingredients a mild alkali, having mild basic properties, incorporated with a sticky substance. The mixture is thinned by suitable oils and a solvent as alcohol or gasoline and made into a paste of the proper consistency to spread readily on the hands. which if too sticky may be dusted with talcum powder or flour.

My composition is particularly useful to garage and automobile battery service stations, where the attendants frequently suffer from burns, particularly of sulphuric acid ($H_2SO_4$) and hydrochloric acid (HCl): but is useful in other industries. My composition will not injure the skin, will allow of easy removal: and may be used as a covering or preparation to be applied where the unprotected hand or skin is burned with acids.

My preferred composition by weight is substantially as follows:—Commercial resin, as a turpentine resin, one pound (1), commercial turpentine four (4) ounces, castor oil one (1) ounce, baking soda (bicarbonate of soda—$NaHCO_3$) three-quarters (¾) pound, Venice turpentine (that is the thick sticky turpentine) two (2) ounces, alcohol (that is ethyl alcohol) three (3) ounces. The resins may be of the colophony or copal or other suitable classes. Wood spirit (methyl alcohol) may be substituted for the ethyl alcohol in a large number of variations of my mixture. A small amount of talcum powder may be put into the composition or it may be dusted on the hands after applying the mixture. I prefer to use part Venice turpentine as distinguished from commercial turpentine because the former gives more body and adherescence to the composition.

My invention may be composed of other ingredients as for instance:—baking soda, a grease (a mineral or animal grease as lard), a shellac and a pitch such as balsam. The mixture would be thinned by alcohol or gasoline. This mixture at first granulates and gets stiff but the alcohol or gasoline forms it into a paste of the desired consistency.

Either of the above mentioned compositions may be spread or rubbed on the hands and form a cover protecting the hands against acid burns and acting as a healing agent in case of burns.

Having described my invention what I claim is:—

1. An adherescent acid resisting composition for the treatment of hands comprising by weight, baking soda twelve (12) ounces, resin one (1) pound, Venice turpentine two (2) ounces, turpentine four (4) ounces, castor oil one (1) ounce, alcohol three (3) ounces.

2. An adherescent acid resisting composition for the treatment of hands, comprising baking soda and resin as major ingredients and Venice turpentine, commercial turpentine, castor oil, and alcohol as minor ingredients.

In testimony whereof I affix my signature.

NEWTON H. SCHNEIDER.